Figures 1, 2:
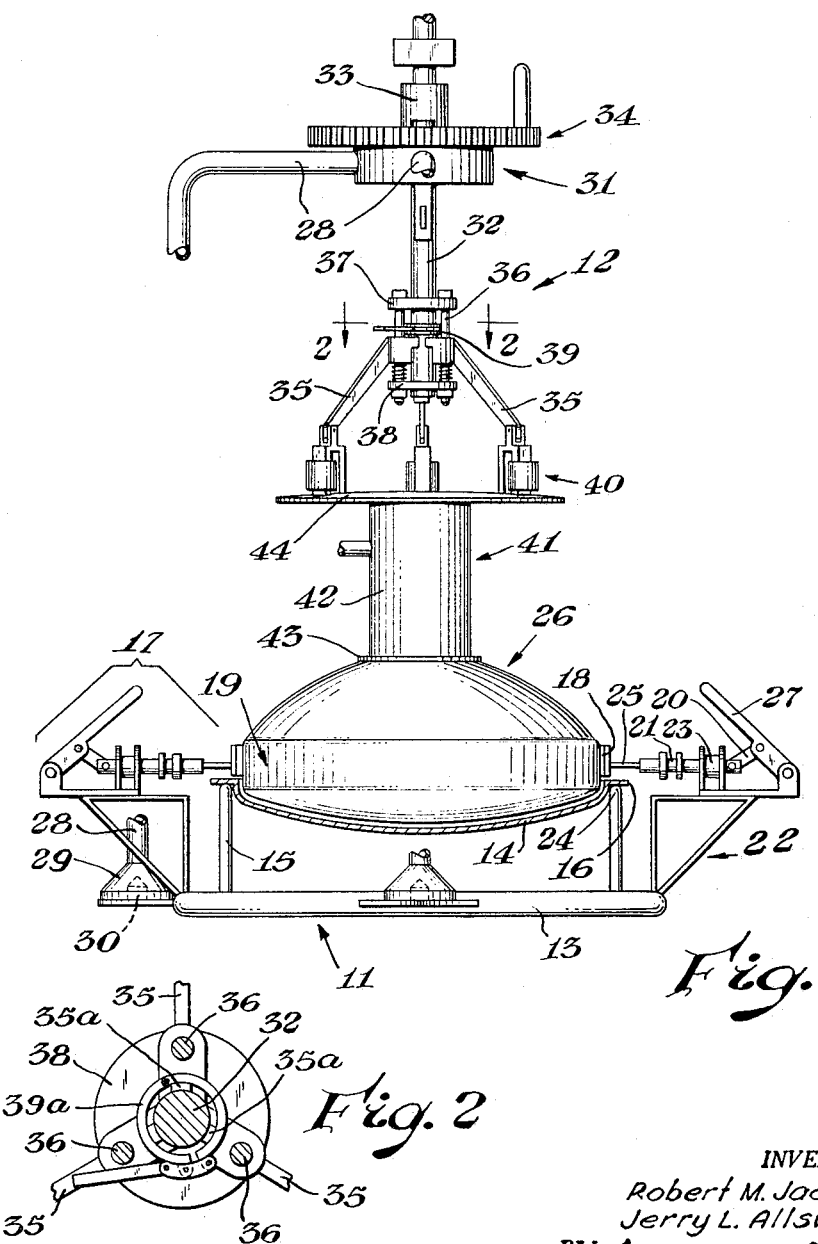

Sept. 27, 1966     R. M. JACKMAN ETAL     3,274,662
POSITIONING MACHINE

Filed Jan. 23, 1961     2 Sheets-Sheet 1

INVENTORS.
Robert M. Jackman
Jerry L. Allswede
BY *Glwynn R Baker*
ATTORNEY

INVENTORS.
Robert M. Jackman
Jerry L. Allswede
BY

ATTORNEY

`3,274,662`
`Patented Sept. 27, 1966`

3,274,662
POSITIONING MACHINE
Robert M. Jackman and Jerry L. Allswede, Midland, Mich., assignors to The Dow Chemical Company, Midland, Mich., a corporation of Delaware
Filed Jan. 23, 1961, Ser. No. 84,412
8 Claims. (Cl. 29—25.19)

The present invention relates to an apparatus for accurate parallel positioning of surfaces apart from one another while maintaining a predetermined perimetric spacing relationship which obtained between the surfaces prior to spacing the major surfaces apart. More particularly the present invention concerns an apparatus for accurately spacing apart curvilinear or irregular shaped objects to facilitate lamination such as, for example, spacing apart a cathode ray tube and the complementary safety shield prior to filling the so-created space with a laminating adhesive.

In order to more readily appreciate and understand the present invention, reference is had to the particular embodiment adaptable to the practice of bonding a safety shield to the viewing surface of a cathode ray tube. While relatively new, this practice of bonding safety shields to cathode ray tubes has achieved considerable recognition in the trade. The rather wide acceptance of this practice prior to extensive development has resulted in many makeshift apparatus adaptations to accomplish assembly-line-like techniques. These adaptations have been necessitated in order to produce the large number of tubes required to meet the demand by the many manufacturers of the electronics equipment using such tubes. One of the more perplexing problems arising out of the assembly-line demands is the accurate spacing of the cathode ray tube viewing surface from the inner surface of the safety shield. It has been determined that an accurate minimum glass-to-glass spacing between the mating surfaces should be accomplished in order to avoid loss of adhesion and/or rupture in the adhesive layer during temperature variations attendant with shipping, storing and operation.

The present day apparatus, adapted to perform the spacing, does not uniformly maintain axial alignment during spacing, thus resulting in clearances less than the minimum found necessary, in the case of cathode ray tubes, to properly laminate the surfaces and to prevent loss of adhesion or rupture during temperature cycling attendant the operation, storage and shipping. Because the complementary surfaces are not uniform machined surfaces and are curved rather than flat, any such translocation or tipping of one surface with respect to the other will result in a clearance less than the acceptable minimum at some point. Further, inaccurate spacing has resulted in the manufacturer increasing the spacing to assure acceptable minimum spacing, thus using in the case of adhesive lamination an excess of adhesive over that required for satisfactory service. This excess usage necessarily results in increased cost of product.

It is an object of this invention to provide an indexing jig or indexing assembly which will accurately space apart non-planar but complementary surfaces, such as for example, a cathode ray tube from the inner surface of a safety shield, and accurately maintain the pre-perimetric position and axial position when so spaced apart. It is an additional object of the present invention to provide a micro-indexing jig assembly which permits rapid and accurate lifting and positioning apart the complementary surfaces of, for example, a cathode ray tube and its safety shield. These and other objects will become apparent to those skilled in the art to which the invention pertains.

Again for ease of presentation, the embodiment of the apparatus for accomplishing the alignment and spacing of surfaces has reference to spacing a cathode ray tube and its complementary safety shield prior to bonding or laminating. With particular reference to the drawing the apparatus shown in FIGURE 1 consists generally of two cooperating elements, the shield holder 11 and the tube moving (spacing) mechanism 12. The shield holder 11 comprises, in one embodiment, a generally rectangularly shaped open framework 13 adapted to receive a cathode ray tube safety shield 14. When the safety shield 14 is dish-shaped (convex-concave) and the laminating adhesive requires pre-heating of the tube and shield, the holder 11 is mobile and each of the four corners of the upper rim of the framework is preferably provided with a brace 15 angularly disposed across the corner to provide the supporting means for the shield 14 which in most present designs of shields is representatively illustrated as having ears 16 at each corner of the shield. Each corner brace or ear support 15 can be provided with an upwardly extending lug or detent means which is disposed in relation to the opposite corner detent means to prevent rotation of the shield 14 within the shield holder 11. It is to be understood that where pre-heating of the tube is not a necessary preliminary step to curing the adhesive, the shield holder 11 can be a simple box or cylinder of sufficient dimensions to receive the shield 14 and hold it in positive relationship to the lifting mechanism 12. In some embodiments of the shield 14 there are no ears at each corner, thus there need be no stop means or lug atop the corners of the shield holder 11. However, in these instances the shield holder 11 is closely dimensioned to hold the shield 14 against movement.

Figure 3:
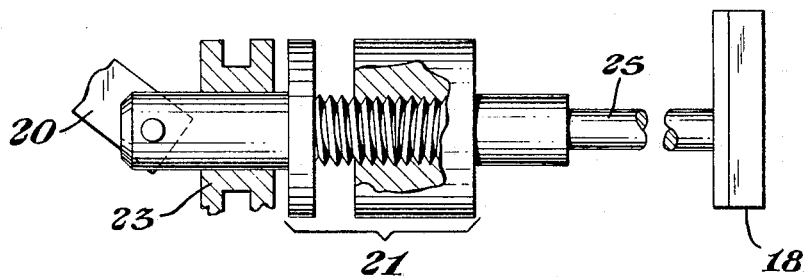

The shield holder 11 is provided with tube-locating means or tube engaging clamp means 17 disposed about the periphery of the shield holder 11 in opposing relation one to the other. Each tube location means 17 shown in detail in FIGURE 3, comprises a resilient faced tube engaging surface 18 which is movable into and out of gripping engagement with a cathode ray tube skirt or side 19. The tube engaging surface 18 is moved into and out of engagement through the manipulation of a pivoted eccentric arm or cam mechanism 20 mounted outside the holder 11 framework 13. The tube locating means 17 is also provided with adjusting means 21 to compensate for irregularities in the tube sizes.

The tube locating means 17 comprises generally, a brace member 22 attached to or near the periphery of the shield holder 11 extending upwardly from the holder 11 and provided with a tubular bearing 23 positioned atop thereof in such a manner as to clear the upper rim 24 of the shield holder 11. Attached to the brace member is an arm eccentric or cam 20 pivotally mounted to a shaft 25 and positioned so that its axis of maximum movement is toward or away from the holder 11 thus providing with shaft 25 and tube engaging surface 18 intimate contact with and holding of the tube skirt 19 when desired and maximum clearance for movement of the tube 26 and/or shield 14 when desired. Shaft 25 is mounted in a position so that movement of lever 27 and thus the arm 20 moves the rod 25 through the tubular bearing 23 toward and away from the periphery of the base 13. Secured to the inward end of the rod or shaft 25 is a resiliently faced clamping surface 18 which moves with the rod 25. One or both of the clamping rods 25 is provided with an axial screw adjustment 21 consisting of a threaded portion and a threaded collar associated within shaft 25 so that accurate alignment of the clamped tube 26 within the confines of the jig 11 can be made after clamping. If only one adjustment collar is desired, the other rod or shaft can be fixed or resiliently (spring) loaded.

Figure 4:
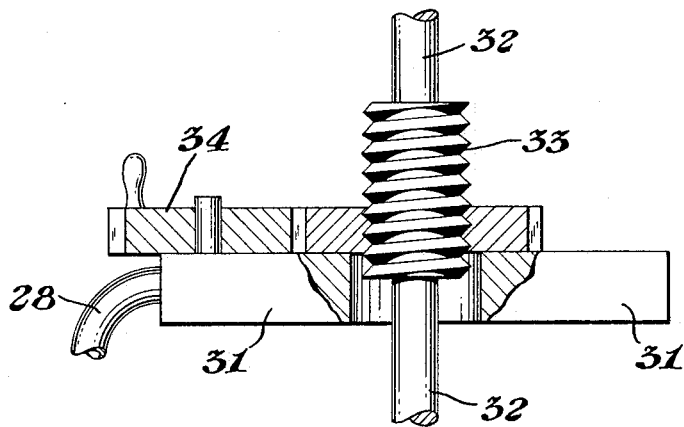

The tube moving (spacing) mechanism 12 as shown in FIGURE 1 and for purposes of ease of illustration an actual mechanical mechanism is shown in FIGURE 4, comprises a stand or support preferably of a tripod-like design consisting of three legs 28, each fitted with a self-centering foot 29 matingly matching with the self-centering lugs 30 on the shield holder 11. The legs 28 of the moving (spacing) mechanism 12 are joined together through lateral inwardly directed extensions which terminate in a central head member 31. The head member 31 is provided with a vertically disposed circular bearing in its center to receive a shaft 32 which extends above and below the head 31. Mounted fixedly on said shaft 32 above said head 31 is an externally threaded collar 33 engageable and movable within an internally threaded spur gear which is provided with gear teeth about its circumference. This gear matingly engages a pinion 34 provided with a handle or other means for operation. It is to be understood that other well known mechanical equivalents for moving the shaft 32 axially in relation to the shield holder 11 plane can be employed.

The end of the shaft 32 within the head 31 and legs 28 is provided with a series of arms 35, each mounted on an individual shaft 36 spaced concentrically about the circumference of the main shaft 32 held in concentric relation by the two circular plates 37 and 38 fixedly spaced apart and secured on the main shaft 32. Each arm 35 is independently freely movable on its shaft 36 until locked into its independently assumed position through locking a mechanism 39 consisting of a strap 39a movable into engagement with extensions 35a of arms 35 through manipulation of an eccentric lever mounted within a collar on the main shaft 32. Each arm 35 is provided at its extremity with attachment means 40 such as an electromagnet or mechanical pick-up pivotally mounted for free movement in a radial direction from the axis of the main shaft. While the assembly above described is that which is presently contemplated as preferable it is to be understood that other arrangements such as providing a series, usually three, substantially equi-spaced dovetail-like slots or keyways longitudinally positioned along the shaft within the head. Each arm is then provided with a mating shoe or key movable longitudinally within the slot in the shaft thus providing good lateral stability. The arms carrying the pick-up can be fixedly secured to the shoes thus to provide a pick-up having the requisite three dimensional stability for accurate spacing.

Cooperatively associated with the end of the main shaft within the framework by a chain or the like is a vacuum chuck 41 which comprises a hollow cup 42 having an outwardly flared open end 43 provided with a conforming gasket such as soft rubber or the like. The closed end of the cup 42 is preferably provided with a segment of a spherical dome 44 or of an approximately spherical shell. The spherical segment 44 is of such dimension as to extend well beyond the outer peripheral reaches of the arms 35 and their associated electromagnets 40. It is to be understood that while a segment of spherical dome or shell is preferred because regardless of the position of the axis of the tube in relation to the axis of the moving mechanism the spherical shaped dome or shell will present a relative plane of engagement for the pick-up substantially oblique to the moving mechanism, whereas a flat plate while operable in accordance with the present invention requires greater adjustment and movement of the pick-up assembly parts.

In order to fully appreciate the operation of the indexing jig assembly of the present invention a brief description of the operation as applied to cathode ray tubes with particular attention to the various pieces of apparatus illustrated in the drawing employed to accomplish the operation is set forth below. A rectangular safety shield having ears at each corner is positioned in a safety shield holder having dimensions sufficient to receive a cathode ray tube safety shield. The safety shield is positioned in a shield holder comprising a framework base of a generally rectangular shape and provided with upper and lower ways and corner braces or columns extending upwardly therebetween of such height as to maintain the shield surface, when in position, above the shield holder frame base line. This particular arrangement is desirable when the assembly must be mobile in order to preheat the assembly to cure the adhesive. The upper ways or railings of the shield holder are provided with detent means to prevent rotation of the safety shield; the ears of the shield abut the top or detent means. Having set the shield in the shield holder, a cathode ray tube is placed in convex to concave glass-to-glass contact. The tube is laterally spaced therein so as to be substantially aligned with both axes of the shield. In order to maintain this lateral spacing there is provided, above the shield holder frame, tube locating means fixedly and opposingly mounted on opposite sides of the holder frame and disposed so as to firmly cooperatively engage opposite edge surfaces of a cathode ray tube. The locating means are releasable and are provided with adjustable means to accommodate size variations in the tube and to permit the perimetric positioning of the cathode ray tube in relation to the safety shield. The tube, shield and shield holder are now ready to be moved under the indexing assembly. To accomplish an acurate axial engagement with the indexing assembly the shield holder is provided with self-centering means engageable with mating means of the moving mechanism. Upon accomplishing the mating of the self-centering means of the holder and moving mechanism, the tube and shield are in a position to be spaced apart one from the other. The moving mechanism is, as aforedescribed, a framework of sufficient size and clearance to encompass the tube, shield and jig assembly. The moving mechanism, provided with an indexing head subassembly positioned above the upper extremity of, for example, a tube when in position, consisting of a gear train which operatively engages a shaft axially positioned through the framework and adapted to move axially and maintain one end within the framework, provided with a pick-up means, illustratively shown in the drawing as electromagnets, which pick-up means is lockable for positive axial movement with the shaft, is cooperatively engageable with a tube-gripping means. The tube-gripping means comprises, in one embodiment, essentially a vacuum cup, the closed end thereof being provided with a spherical segment of such dimensions as to cooperatively engage the pick-up means in a manner such that even though the axis of the cup, and thus the tube, is not in alignment with the lifting means axis, the plane of lifting is parallel with the jig baseplane. The vacuum cup is placed over the gun end of the cathode ray tube and the cup evacuated to grip the tube. The lifting means is then operated by the gear train to lower the shaft and pick-up means, the pick-up means being unlocked so that each arm is free to move into independent contact with the spherical segment of the tube gripping means. When the pick-up means arms have made independent contact the electromagnets are energized and the lifting arms are locked in position. The tube locating means is released, the tube raised in relation to the shield by operation of the gear train of the indexing head. The tube and shield are now in a spaced apart position and ready to receive the laminating adhesive. The adhesive can be introduced in any of a number of ways, as for example, dispensing the adhesive material through a tube placed into the cavity between the safety shield and the cathode ray tube or merely pouring the resin into the cavity. When the filling operation is complete the tube-locating means of the shield holder are re-engaged thus maintaining the perimetric spacing position of the tube and shield. Air is admitted to the tube-gripping cup and the entire moving assembly moved out of the way. The tube and shield are then set aside during which period the laminated assembly cools and the adhesive material cures or solidifies.

It thus becomes obvious that by the employment of several shield holders and a single indexing mechanism an assembly line technique can be established to provide for the rapid and accurate spacing of the tube and the shield, introduction of resin in the void created by the spacing, and maintaining the predetermined position until the resinous adhesive material has cured, thus avoiding the difficulties previously attendant with the spacing apart of the tube and the shield.

It is apparent that various modifications can be made in the structural components of the apparatus and that various materials for construction can also be employed. Thus for example, one can employ tubing or a rod which may be welded, bolted or otherwise secured to form the familiar configurations of the necessary apparatus.

The following is a brief description of operation with particular attention to the apparatus and its functional relationship to accomplish the spacing of a cathode ray tube and a safety shield prior to introduction of a laminating adhesive.

A cathode ray tube safety shield, of substantially rectangular dish-shape and provided with projections or ears at each corner of its upper peripheral edge, is placed in a shield holder which is of general dimensions to receive the shield, holding the major surface above a base line. The shields rest within the holder on corner braces being held up by the ears. The holder has a plurality of detents arranged to prevent rotational movement of the shield within the holder. Secured to the holder in a manner to operatively clear the shield in the holder are oppositely disposed cathode ray tube locating means, i.e., skirt or rim clamps. These tube locating means are resiliently, lockably, fixedly mounted on the holder in such position so that a cathode ray tube placed in the dish-shaped cavity of the shield can be fixedly held in a pre-determined perimetric spaced relationship with respect to the skirt or rim of the shield. The perimetric spacing can be accomplished by use of maximum and minimum standard feeler gauge or by other well known means such as, for example, a dial gauge or micrometer, indexed on the vertical shaft. A cathode ray tube is positioned in the shield cavity, in glass-to-glass contact; the feeler gauge used to position the tube perimetrically within the shield and the tube clamped as therein spaced by bringing the tube locating means into position against the tube skirt or rim and locking the locating means thereagainst. The perimetric spaced tube, and shield and holder are now moved into position below a moving assembly. The moving assembly, a generally frame-like structure, is brought into self-centering engagement with the holder which is fitted with mating self-centering means. A cup-shaped vacuum pick-up is placed over the gun-end of the tube and a vacuum drawn on the cup thus fixedly engaging the cup and the tube. The cup has associated with its closed end a spherical shell segment. Above the spherical segment in engageable contact therewith is a cup lifting mechanism having a series of pick-up arms unilaterally lockable in self-seeking vertical position and thus fixedly movable with an axially vertically movable shaft motivated through an indexing mechanism mounted centrally within the frame-like structure of the lifting assembly. Upon positive engagement of the cup and tube the shaft and cup-lifting mechanism are lowered in order to engage the pick-up arms with the spherical segment of the cup. The pick-up arms are fixedly engaged by energizing the magnets. The arms are then locked into the self-assumed position on the shaft by cam locking means and the tube-locating means released. The tube is now free to move axially with the shaft of the moving assembly upon operation of the indexing mechanism. The operation of the indexing mechanism moves the tube from glass-to-glass contact with the shield to the desired spaced-apart position while maintaining the exact perimetric spacing relationship with the shield. When the desired spacing is accomplished an optically clear, flexible, curable laminating adhesive can be introduced into the void between the tube and shield. Upon completion of the filling of the void the tube locating means of the holder are re-engaged and locked against the tube skirt as before. The vacuum of the cup is released and the entire moving assembly moved up and away from the engagement with holder. Holder can now be moved to a station to await curing of the resinous adhesive.

We claim:

1. A mechanism for aligning in spaced apart relationship two members having substantially mating surfaces which comprises a perimetric receiving, spacing and holding frame having matching member locating means, said frame being provided with self-centering means about its periphery; a matching member moving element, said moving element consisting of a frame network having self-centering mating engagement means to mate with said holding frame self-centering means and being provided with an axially positioned adjustable moving means having in engageable intermittently lockable position an open ended vacuum cup closed on one end by a plate which extends peripherally beyond the cup diameter, said cup being engageable with one of said matching members and capable of holding said member for movement axially away from said other member.

2. A mechanism for accurately spacing two surfaces apart one from the other which comprises a free-floating vacuum chuck having the closed terminus approximating a spherical segment, convex face toward a gripping device, a tripodal assembly in engageable position to said spherical segment having a lockable gripping device which when engaged with said spherical segment and locked in engagement therewith fixedly associates said chuck with said tripodal assembly, and means for moving said chuck and gripping device axially within said tripodal assembly.

3. A lifting and aligning mechanism comprising a body gripping member having associated therewith a segment of a dome; a lockable dome gripping means; a vertically aligned shaft having means associated therewith to move the said shaft axially whereby when said dome gripping means engages said dome and said shaft is axially moved the aforesaid entire assembly is moved uniaxially, said assembly being provided with a framework to house the said assembly and a framework to receive and perimetrically align matching members prior to spacing.

4. A mechanism as set forth in claim 3 wherein said body gripping member is an open ended cup-shaped member provided with a peripheral resilient facing about the rim of said open end, and the closed end having a spherical segment associated therewith, said head portion being a spherical convex surface.

5. An apparatus for aligning from the gun end, a cathode ray tube with a safety shield preparatory to lamination of the safety shield to the viewing surface of the cathode ray tube, which comprises the combination of body gripping member means closed at one end adapted to engage the rear surface of the tube about the gun; a dome-like segment integrally axially associated with said closed end of said body gripping member means; dome-gripping means adapted to lockably engage the dome-like segment; and, means associated with said dome-gripping means to move said dome gripping means axially.

6. An apparatus for aligning a cathode ray tube and moving said tube, without otherwise disturbing its orientation, in relation to a cathode ray shield, the combination comprising a tube gripping means adapted to engage the rear surface of the tube about the gun, said tube gripping means having one end terminating in a segment of a spherical dome concave side toward the tube gripping means; dome gripping means adapted to be intermittently lockably engageable with the convex surface of said spherical dome end of said tube gripping means; and, means to move said tube gripping means and dome gripping means in axial direction maintaining perimetric alignment of the tube and shield.

7. A device for axially separating irregular shaped substantially matching surfaces of two solid bodies from one another in a manner so as to maintain approximately equal linear spacing between all pairs of initially contacting points on said surfaces, which device comprises a body-holding frame for supporting a first solid body and a lifting means for carrying and moving a second solid body, said holding frame and moving means being aligned with respect to one another to accomplish axial movement of one body with respect to the other; the lifting means comprising an axially aligned first shaft provided with means for moving the shaft axially, a pair of spaced collars mounted on the holding frame of said shaft, said collars having at least three second shafts mounted therebetween concentrically about said first shaft, each of said second shafts having mounted thereabout a bearing collar having an outwardly angularly depending arm extending therefrom, said arm terminus being provided with an electromagnetic pick-up pivotally connected thereat; said bearing collar having a shoe extending therefrom in cooperative engagement with an eccentric operated brake band mounted on the first said shaft; a vacuum cup having the open end thereof provided with a resilient facing and the other end closed with a spherical segment having its concave side exterior of said cup and being of sufficient size to extend beyond the maximum radial movement of the pick-up.

8. A pick-up and body-engaging device comprising a body-gripping means consisting of a cup-shaped member having a spherical segment associated with its closed end; a pick-up member mounted on a main shaft and consisting of a series of arms independently moveable on short shafts concentrically mounted about said main shaft, said arms being lockable and unlockable in relative movement axially to said main shafts, each arm terminating in a spherical-segment engaging means, said means being capable of rigidly gripping the said segment and being detachable therefrom; means for moving said main shaft axially; and means for positioning said main shaft and its moving means in axial alignment with a body-holding frame.

References Cited by the Examiner
UNITED STATES PATENTS

| | | | |
|---|---|---|---|
| 2,069,746 | 2/1937 | Andrews | 18—5.7 |
| 2,091,885 | 8/1937 | Saidel | 18—5.7 |
| 2,832,602 | 4/1958 | Coupe | 279—3 |
| 2,886,335 | 5/1959 | Mitchell | 279—3 |
| 2,895,739 | 7/1959 | Smith | 279—3 |
| 3,082,513 | 3/1963 | Bracht et al. | 156—304 |

EARL M. BERGERT, *Primary Examiner.*

CARL F. KRAFFT, *Examiner.*

R. I. SMITH, M. L. KATZ, *Assistant Examiners.*